United States Patent
Greene

(10) Patent No.: US 7,770,198 B1
(45) Date of Patent: Aug. 3, 2010

(54) TRANSPARENT CACHING OF REPEATED VIDEO CONTENT IN A NETWORK

(75) Inventor: Spencer Greene, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1049 days.

(21) Appl. No.: 11/303,744

(22) Filed: Dec. 16, 2005

Related U.S. Application Data

(60) Provisional application No. 60/734,393, filed on Nov. 8, 2005.

(51) Int. Cl.
*H04N 7/173* (2006.01)

(52) U.S. Cl. ............... 725/93; 725/36; 725/116; 725/146

(58) Field of Classification Search ........... 725/32–36, 725/86–103; 382/244–247
See application file for complete search history.

(56) References Cited

U.S. PATENT DOCUMENTS

| | | | | |
|---|---|---|---|---|
| 6,810,526 | B1 * | 10/2004 | Menard et al. | 725/46 |
| 6,856,651 | B2 | 2/2005 | Singh | |
| 2001/0047466 | A1 | 11/2001 | Topham | |
| 2002/0049977 | A1 * | 4/2002 | Miller et al. | 725/82 |
| 2002/0069420 | A1 * | 6/2002 | Russell et al. | 725/92 |
| 2002/0071438 | A1 | 6/2002 | Singh | |
| 2002/0083439 | A1 * | 6/2002 | Eldering | 725/32 |
| 2004/0148634 | A1 * | 7/2004 | Arsenault et al. | 725/89 |
| 2004/0187160 | A1 * | 9/2004 | Cook et al. | 725/94 |
| 2005/0028194 | A1 * | 2/2005 | Elenbaas et al. | 725/32 |

OTHER PUBLICATIONS

N. Spring and D. Wetherall, "A Protocol-Independent Technique for Eliminating Redundant Network Traffic," ACM SIG Comm 2000, pp. 87-95, Stockholm, Sweden, Aug. 2000.

U.S. Appl. No. 11/233,357, entitled "Network Acceleration and Long-Distance Pattern Detection Using Improved Caching and Disk Mapping," filed Sep. 22, 2005.

* cited by examiner

*Primary Examiner*—Scott Beliveau
*Assistant Examiner*—Nicholas T Corbo
(74) *Attorney, Agent, or Firm*—Shumaker & Sieffert, P.A.

(57) ABSTRACT

Techniques are described for detection of repeated video content to reduce an amount of high bandwidth traffic transmitted across a network from a video source device to remote subscriber devices. In particular, the invention relates to a first intermediate device capable of recognizing patterns of video content and sending a communication to a second intermediate device that transmits a cached version of the video content. In this way, the first intermediate device does not have to resend the high bandwidth video content over the network. The network may comprise any private or public network.

39 Claims, 8 Drawing Sheets

| VIDEO PATTERN | VIDEO PATTERN IDENTIFIER | RECEIVING NETWORKS |
|---|---|---|
| BASKETBALL GAME | 75 | RCC 1, RCC 2 |
| INNING 3 OF BASEBALL GAME | 76 | RCC 1, RCC 14, RCC 17 |
| MOVIE A | 82 | RCC 5, RCC16 |

TRANSPARENT CACHING OF REPEATED VIDEO CONTENT IN A NETWORK

This application claims the benefit of U.S. Provisional Application Ser. No. 60/734,393, filed Nov. 8, 2005, the entire content of which is incorporated herein by reference.

TECHNICAL FIELD

The invention relates to computer networks, and more particularly to sending video content on computer networks.

BACKGROUND

Traditional video delivery involves simultaneously broadcasting video content signals to multiple user devices, such as televisions, set-top boxes, personal computers, laptops, workstations, personal digital assistants (PDAs), wireless devices, network-ready appliances, file servers, print servers or other devices. Broadcasting stations may transmit the video content signals via satellite signals to local stations or cable distributors. The video content signals then travel over cable television lines, satellite distribution systems, or the airwaves to the user device. Each user selects one of the available channels to view a program at the time of broadcasting.

Recently, video delivery has moved from simultaneous broadcasting to interactive video delivery systems, such as Video-on-Demand (VoD). Interactive systems offer a wider selection of programs that are available at any time. In this way, users may select the time and program rather than depending upon the program times of the broadcasting stations.

A typical VoD service provider utilizes one or more video servers capable of storing terabytes of video content. The video servers deliver video content via data connections, such as DSL or cable, to multiple subscriber networks. For example, a user or subscriber device requests video content through one of the subscriber networks, which in turn communicates the request to the video server via a private or public network, e.g., the Internet. The VoD service provider sends the requested video content to the subscriber network, which forwards the video content to the requesting subscriber device. In order to deliver the program, the VoD service requires sufficient guaranteed bandwidth from the server through to the subscriber.

In an attempt to address the resource demands of delivering video content, a compression protocol may be used to reduce the size of large video files prior to transmitting the video files across a network. For example, the compression protocol may comprise the Moving Pictures Expert Group (MPEG) compression protocol. However, compressed MPEG video content may still require a great deal of bandwidth when transmitted over a private or public network, such as the Internet.

SUMMARY

In general, the invention relates to detection of repeated video content to reduce an amount of high bandwidth traffic transmitted across a network from a video source device to remote subscriber devices. In particular, the invention relates to a first intermediate device capable of recognizing patterns of video content and sending a communication to a second intermediate device that identifies a cached version of the video content. In this way, the first intermediate device does not have to resend the high bandwidth video content over the network. The network may comprise any private or public network, such as the Internet.

For example, the invention may utilize a repeated content detection (RCD) device connected to a video server, to communicate with repeated content cache (RCC) devices located at subscriber networks that include subscriber devices. The RCC devices cache repeated video patterns detected by the RCD. The RCD and RCC intermediate devices communicate across the network via a common dictionary of terms relating to patterns of video content and a designator or key associated with each repeated pattern. The intermediate devices communicate in a manner that is transparent to the video server and the subscriber devices.

In one embodiment, a method comprises forwarding a video stream received from a source device to an intermediate device, sending a first communication to the intermediate device directing the intermediate device to cache a video pattern of the video stream, sending a second communication to the intermediate device directing the intermediate device to output the cached video pattern of the video stream, and maintaining a directory that includes the intermediate device and the cached video pattern of the video stream cached in the intermediate device.

In another embodiment, a method comprises receiving a video stream from a source device via an intermediate device, caching a video pattern of the video stream based upon a first communication received from the intermediate device, and sending the cached video pattern of the video stream to a destination device based upon a second communication received from the intermediate device.

In another embodiment, a system comprises a video source device, a first intermediate device that receives a video stream from the video source device and detects repeated patterns within the video stream, a second intermediate device that receives communications from the first intermediate device directing the second intermediate device to cache video patterns of the video stream associated with the repeated patterns of video stream and to retrieve the cached video patterns of the video stream, and a plurality of destination devices that receive the cached video patterns of video stream from the second intermediate device.

In another embodiment, a network device comprises an intermediate device interface that forwards a video stream received from a source device to an intermediate device, sends a first communication to the intermediate device directing the intermediate device to cache a video pattern of the video stream, and sends a second communication to the intermediate device directing the intermediate device to output the cached video pattern of the video stream, and a video pattern database that maintains a directory including the intermediate device and the cached video pattern of video stream cached in the intermediate device.

In another embodiment, a network device comprises an intermediate device interface that receives a video stream from a source device via an intermediate device, a cache manager that caches a video pattern of the video stream based upon a first communication received from the intermediate device, and a subscriber device interface that sends the cached video pattern of the video stream to a destination device based upon a second communication received from the intermediate device.

The details of one or more embodiments of the invention are set forth in the accompanying drawings and the descrip-

BRIEF DESCRIPTION OF DRAWINGS

FIG. 4 is an exemplary pattern database of an RCD device.

DETAILED DESCRIPTION

Figure 1:
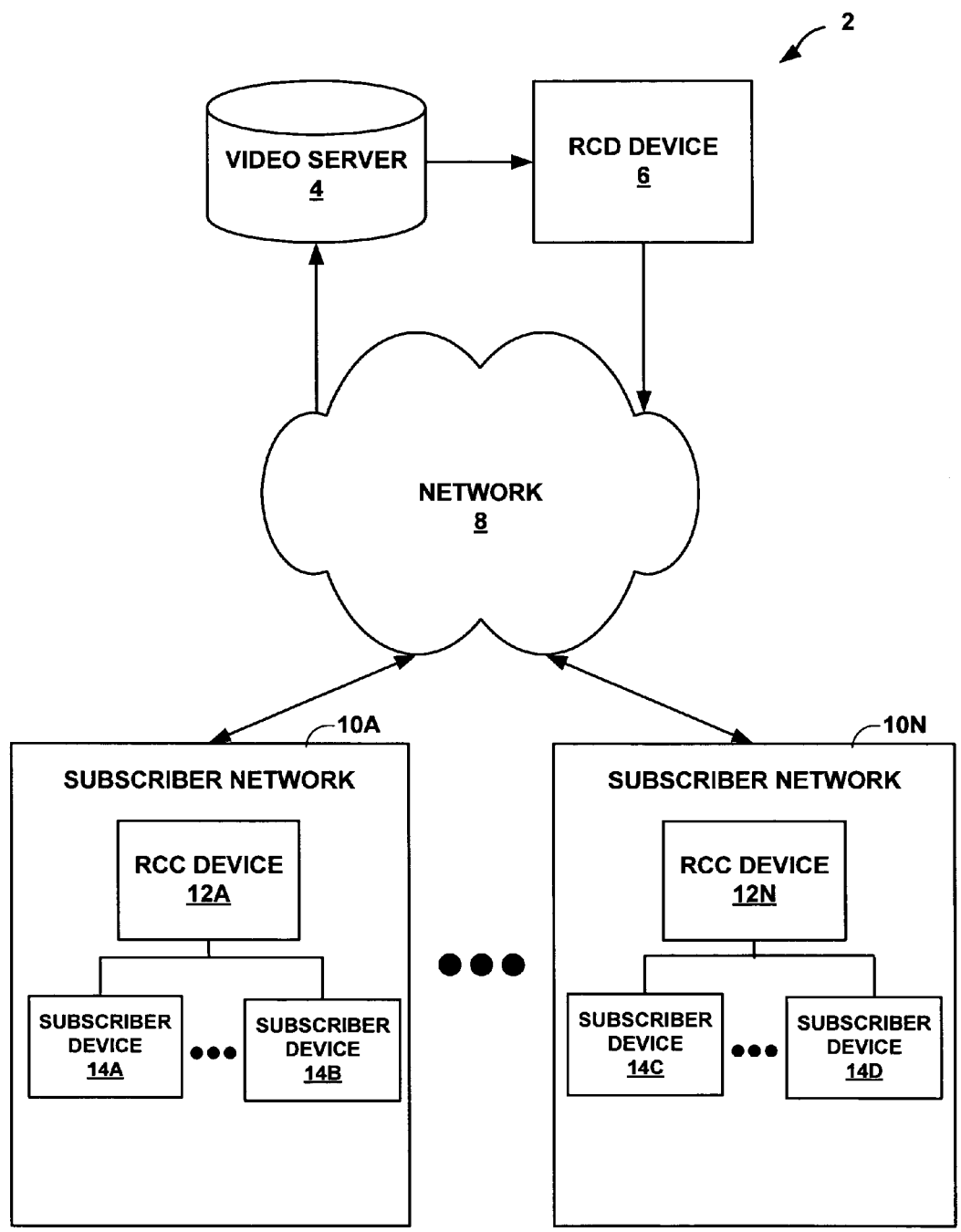
FIG. 1 is a block diagram illustrating an exemplary video delivery system.

FIG. 1 is a block diagram illustrating an exemplary video delivery system 2. In the example embodiment, video delivery system 2 includes a video server 4 connected to a repeated content detection (RCD) device 6 (an intermediate device). Video server 4 and RCD device 6 communicate with numerous remotely located subscriber networks 10A-10N ("subscriber networks 10") via network 8. Network 8 may comprise any private or public network, such as the Internet or a hybrid fiber coax (HFC) network. Network 8 represents any computer network and may have a variety of networked resources capable of data communication. For example, network 8 may include routers, hubs, gateways, switches or other components.

Subscriber networks 10 contain repeated content cache (RCC) devices 12A-12N ("RCC devices 12"), respectively, for communicating with RCD device 6 via network 8. RCC devices 12 are intermediate devices. Furthermore, each of RCC devices 12 connects to multiple subscriber devices either directly or through a network. For purposes of illustration, FIG. 1 depicts RCC device 12A connected to subscriber devices 14A and 14B and depicts RCC device 12N connected to subscriber devices 14C and 14D. Subscriber devices 14A-14D ("subscriber device 14") may comprise set-top boxes, personal video recorders, desktop computers, laptops, workstations, PDAs, wireless devices, network-ready appliances, file servers, print servers or other devices. In other embodiments, each of RCC devices 12 may be connected to any number of subscriber devices 14.

As described herein, video delivery system 2 enables any of subscriber devices 14 within subscriber networks 10 to request a particular video stream from video server 4. Upon receiving a request for a video stream from a subscriber device, video server 4 sends the video stream to RCD device 6 through a direct or network connection. When RCD device 6 receives the video stream from video server 4, RCD device 6 attempts to recognize whether RCD device 6 previously received video patterns within the video stream. When RCD device 6 does not recognize the video patterns requested by one or more of subscriber devices 14, or recognizes a video pattern that is not stored by the RCC device serving the requesting subscriber device, RCD device 6 sends the video stream to one or more of subscriber networks 10 via network 8. In addition, RCD device 6 may direct one or more of the RCC devices 12 to cache at least a video pattern of the requested video stream. For each video pattern that RCD device 6 directs an RCC device to cache, RCD device 6 sends a video pattern identifier. A video pattern identifier provides a name for a variable-length video pattern that RCD device 6 and the RCC device share. After receiving the video pattern and the video pattern identifier, RCC devices 12 caches the video pattern and sends the video pattern to each of the requesting subscriber devices 14.

When RCD device 6 recognizes the video stream requested by one or more of subscriber devices 14 and RCD device 6 knows that the RCC device serving the requesting subscriber devices has cached a video pattern of the video stream, RCD device 6 sends one or more video pattern identifiers to the RCC device. If RCD device 6 sends the video stream to multiple RCC devices, RCD device 6 may send different video pattern identifiers to each RCC device, depending on the video patterns cached by each respective RCC device. After receiving a video pattern identifier from RCD device 6, each of RCC devices 12 retrieves the cached video pattern associated with the video pattern identifier and sends the video pattern to each of the requesting subscriber devices 14 as part of the requested video stream. In this way, RCD device 6 does not have to resend a complete copy of the video stream over network 8.

To deliver a full video stream to a subscriber device, RCC devices 12 may splice together video patterns received directly from RCD device 6 with video patterns retrieved cached by RCC devices 12. In other words, a RCC device might cache only some of the video patterns that constitute a full video stream. For the remaining video patterns that constitute the video stream, the RCC device receives the video patterns from RCD device 6. For example, RCC 12A may cache the first five minute pattern and the third five minute pattern of a television show. When a subscriber requests the television show, RCC device 12A delivers the first five minute pattern of the show from the cache, then delivers the second five minute pattern of the show directly from RCD device 6. Finally, RCC device 12A delivers the third five minute pattern of the show from the cache. RCC device 12A splices these video patterns together seamlessly.

As described in detail below, the addition of RCD and RCC intermediate devices may greatly reduce the amount of bandwidth utilized by a video delivery system. The reduction in bandwidth usage may enable the video delivery system to service additional subscriber devices or, if desired, the video server may be located at a central site that is further away from the subscriber networks. Alternatively, the reduced bandwidth usage may reduce build-out cost of network 8. Furthermore, caching repeated video patterns that comprises only a portion of a video program may simplify the insertion of viewer dependent advertising into the video program. In addition, communication between RCD device 6 and RCC devices 12 may be transparent to subscriber devices 14 and video server 4. In other words, video server 4 and subscriber devices 14 are not aware that RCD device 6 and RCC devices 12 are present. Such transparency may reduce the complexity and cost associated with subscriber devices 14 and video server 4.

Figure 2:
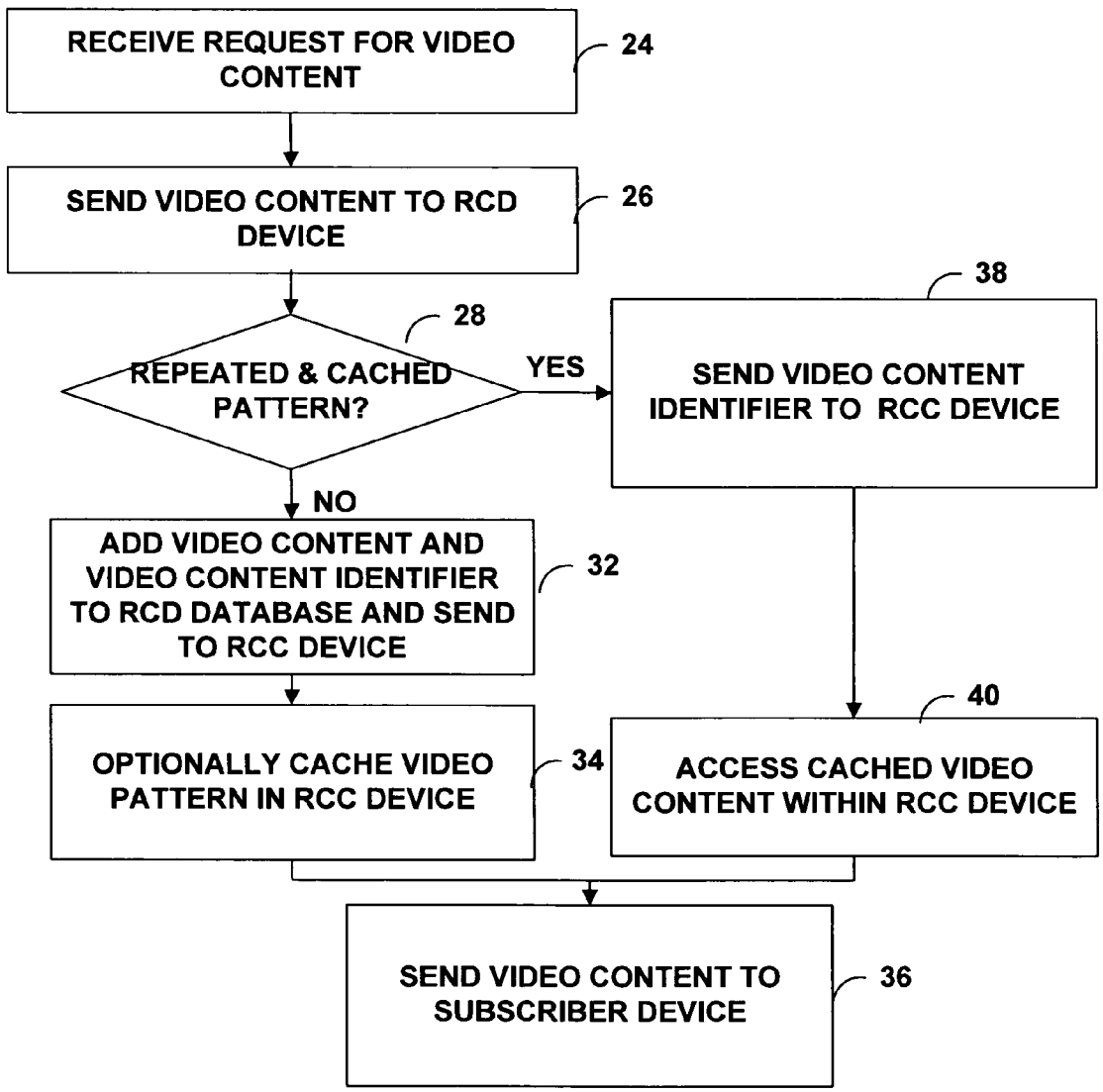
FIG. 2 is a flow chart illustrating an exemplary video request process of a video delivery system.

FIG. 2 is a flowchart illustrating an exemplary video request process of a video delivery system. The video request process is described herein relative to video delivery system 2 from FIG. 1. Initially, subscriber device 14A, for example, requests a video stream from video server 4 (24).

Upon receiving the request, video server 4 sends the requested video stream to RCD device 6 (26). RCD device 6 and RCC devices 12 maintain common dictionaries of video pattern patterns. This enables RCD device 6 to determine if RCC device 12A has cached the video pattern (28). For instance, RCD device 6 may recognize when another subscriber device within subscriber network 10A has previously requested the video stream currently requested by subscriber device 14A, and when the video pattern is currently cached in RCC device 12A.

If the requested video pattern is not cached by RCC device 12A (no branch of 28), then RCD device 6 may add the video pattern and a video pattern identifier associated with the video pattern to a database. RCD device 6 sends the appropriate video pattern and video pattern identifier to RCC device 12A (32). RCC device 12A then caches the video pattern (34), and sends the video pattern to subscriber device 14A as part of the requested video stream (36).

If the requested video pattern is cached by RCC device 12A (yes branch of 28), then RCD device 6 sends a communication that includes a video pattern identifier assigned to the video pattern to RCC device 12A (38). RCC device 12A uses the video pattern identifier received in the communication from RCD device 6 to access the cached video pattern (40). RCC device 12A then sends the retrieved cached video pattern to subscriber device 14A as part of the requested video stream (36). This pattern recognition process continues through the entire delivery of the program, for variable length patterns within the program.

Figure 3:
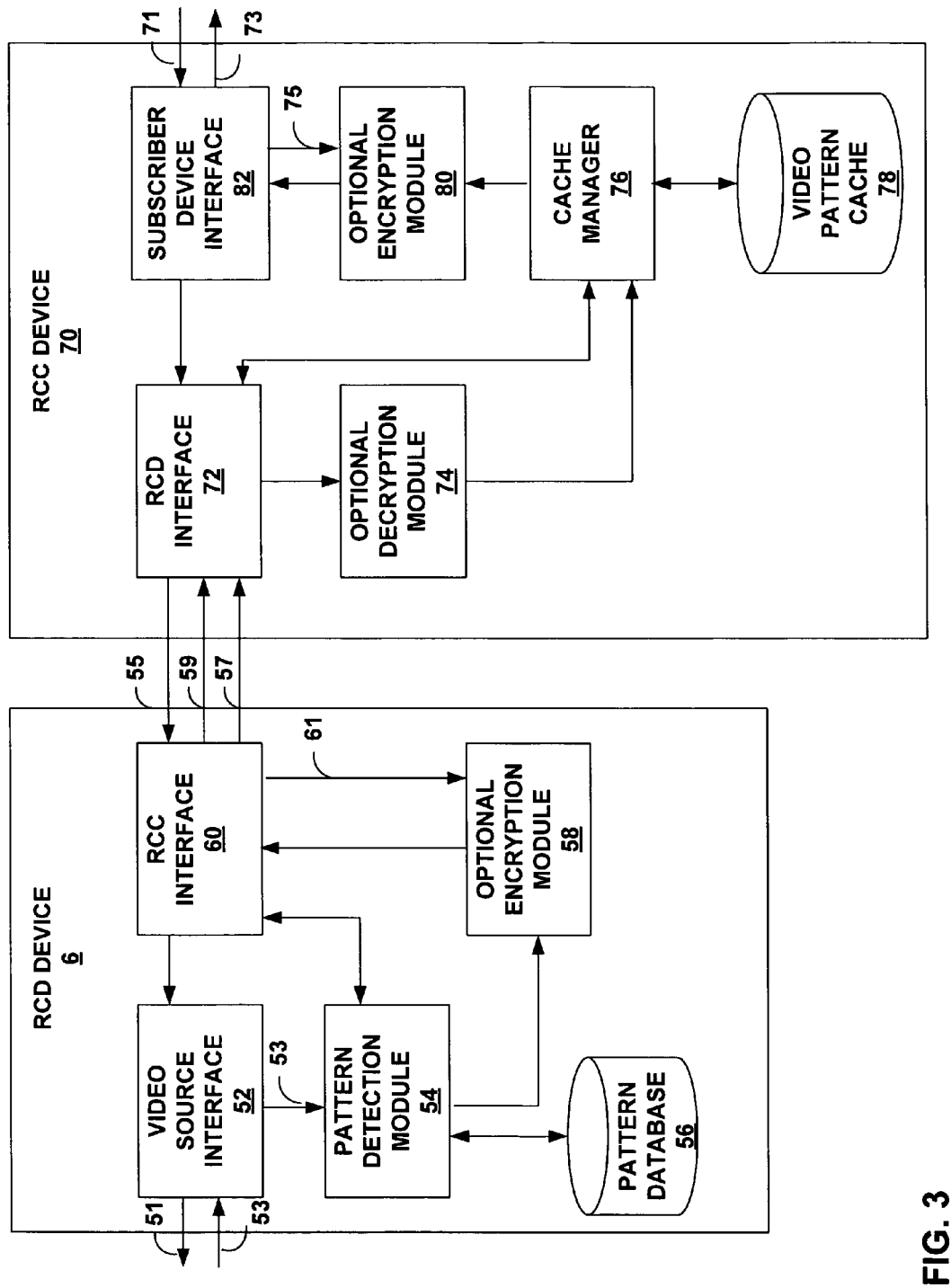
FIG. 3 is a block diagram illustrating an exemplary embodiment of the RCD and RCC devices.

FIG. 3 is a block diagram illustrating an exemplary embodiment of a RCD device and a RCC device within a video delivery system. For purposes of explanation, continuing reference is made to FIG. 1. In this exemplary embodiment, RCD device 6 includes a video source interface 52, a pattern detection module 54, a pattern database 56, an encryption module 58, and RCC interface 60. Video source interface 52 receives a video stream 53 from the video source device.

RCC interface 60 may receive conditional access status information 55 from RCC device 70. RCC interface 60 sends the conditional access status information of the subscriber network to encryption module 58. RCD device 6 may use the conditional access status information to prevent unauthorized access. In particular, RCD device 6 may send encrypted data to an authorized source that decrypts the received data. Since video delivery system 2 may deploy multiple conditional access schemes, RCC interface 60 sends the conditional access status 61 to encryption module 58. RCC interface 60 also sends requested video content 57 and references of video patterns 59 to RCC device 70.

Pattern detection module 54 receives video stream 53 from video source interface 52 and ascertains whether the relevant RCC device has cached a video pattern in video stream 53. In particular, pattern detection module 54 determines whether video stream 53 contains any cached video patterns by comparing the patterns of video stream 53 to remotely cached video patterns stored within pattern database 56. For example, multiple subscriber devices in the same subscriber network may be watching the same live sporting event at "nearly" the same time, meaning one subscriber may have rewound to be one minute behind the live video feed, while another subscriber may be just ten seconds behind the live video feed. In this case, RCC device 70 need not cache the entire program since caching just the last five minutes satisfies all subscriber requests. Furthermore, this pattern detection technique may enable the insertion of advertising that is customized for each viewer depending on the viewer location, the time of day, or any other viewer properties.

Pattern detection module 54 may conform to both lossless and "lossy" video delivery protocols. If the video source device delivers a video stream with a lossless protocol, then pattern detection module 54 searches for repetitions at the bit level. If the video source device delivers a video stream with a lossy protocol, such as MPEG, then pattern detection module 54 searches for repetitions or near-repetitions at the granularity of blocks of pixels, groups of blocks of pixels, frames, IBP frame sequences, one minute patterns, or similar video specific granularities.

Each pattern or pattern identifier stored within pattern database 56 is associated with a list of one or more RCC devices that have cached the video pattern. If pattern detection module 54 detects a repeated pattern for RCC device 70, then pattern detection module 54 sends a video pattern identifier to RCC interface 60, which then forwards a communication that includes the video pattern identifier to RCC device 70. If pattern detection module 54 determines that all or a portion of the received video pattern was not previously received by RCC device 70, then pattern detection module 54 sends the newly requested pattern of the video stream to encryption module 58.

Encryption module 58 reads the conditional access status 61 received from RCC interface 60 to determine whether RCD device 6 needs to encrypt the video stream. For example, if RCC device 70 performs encryption, then RCD device 6 does not need to use encryption module 58 since the RCC device encrypts the video stream for the decryption module within the subscriber device. In this example, the conditional access status 61 instructs encryption module 58 to send unencrypted video streams to RCC interface 60. In another example, if RCC device 70 contains an enabled decryption module, then the conditional access status instructs encryption module 58 to encrypt the video streams prior to sending the video streams to RCC interface 60.

RCC device 70 includes a RCD interface 72, a decryption module 74, a cache manager 76, a video pattern cache 78, an encryption module 80, and a subscriber device interface 82. Subscriber device interface 82 may receive commands 71 that include conditional access status information from the subscriber devices. Subscriber device interface 82 may also send conditional access status information 75 to encryption module 80. RCD interface 72 may forward commands 55 including conditional access status information 55 to RCD device 6. In addition, RCD interface 72 receives requested video streams 57 and video pattern identifiers of video patterns 59 from RCD device 6. If RCD device 6 did not encrypt the video stream, RCD interface 72 sends the received video stream and the received video pattern identifiers to cache manager 76. On the other hand, if RCD device 6 encrypted the video stream, RCD interface 72 may send the video stream and video pattern identifiers to decryption module 74. Decryption module 74 receives the video stream from RCD interface 72, decrypts any encrypted video data, and forwards the resulting video data and video pattern identifiers to cache manager 76. In an alternate embodiment, RCD device 6 forwards encrypted video stream directly to cache manager 76.

Cache manager 76 receives a video stream from decryption module 74 and a video pattern identifier from RCD interface 72. If RCE device 50 has instructed RCC device 70 to cache a specified video pattern, cache manager 76 determines whether video pattern cache 78 contains the specified video pattern. If video pattern cache 78 does not contain the specified video pattern, cache manager 76 caches the video pattern in video pattern cache 78. After caching the specified video pattern, cache manager 76 forwards the video pattern to encryption module 80.

Subsequently, RCD interface 72 may receive a communication from RCD device 6 containing a video pattern identifier. Upon receiving the video pattern identifier, RCD interface 72 forwards the video pattern identifier to cache manager 76. Cache manager 76 then retrieves the video pattern identified by the video pattern identifier from video pattern cache 78. Cache manager 76 then sends the retrieved video pattern to encryption module 80 as part of the video stream.

Encryption module 80 reads the conditional access status 75 received from subscriber device interface 82 to determine whether or not encryption module 80 needs to encrypt the video stream. For example, if the subscriber device contains a decryption module then RCD device 70 may need to encrypt the video stream with encryption module 80. Depending upon the conditional access status, encryption module 80 may send an encrypted or unencrypted video stream to subscriber device interface 82 which then forwards the video stream to the subscriber device.

FIG. 4 is an exemplary pattern database 90 of an RCD device. For purpose of explanation, continuing reference is made to FIG. 3. For example, pattern database 90 may be substantially similar to pattern database 56 of RCD device 6 from FIG. 3. Pattern database 90 receives video patterns from pattern detection module 54 within RCD device 6. Pattern database 90 stores an entry that describes a relation between a plurality of RCC devices and video patterns cached in the plurality of RCC devices. In particular, an entry in pattern database 90 contains patterns associated with a video pattern. An entry also contains an assigned video pattern identifier. Additionally, an entry in pattern database 90 stores a reference to each RCC device that has cached the video pattern.

When RCD device 6 receives a video pattern that is cached on an RCC device in the subscriber device's network, RCD device 6 may send a communication that includes the video pattern identifier for the video pattern from database 90 to the RCC device. After receiving the video pattern identifier, the RCC device accesses a cached video pattern associated with the received video pattern identifier.

In an alternative embodiment, pattern database 56 does not store video patterns. Rather, this embodiment of pattern database 56 stores an RCC cache location with each video pattern identifier or hash. This embodiment may substantially eliminate the need to store any video patterns in RCD device 6.

Figure 5:
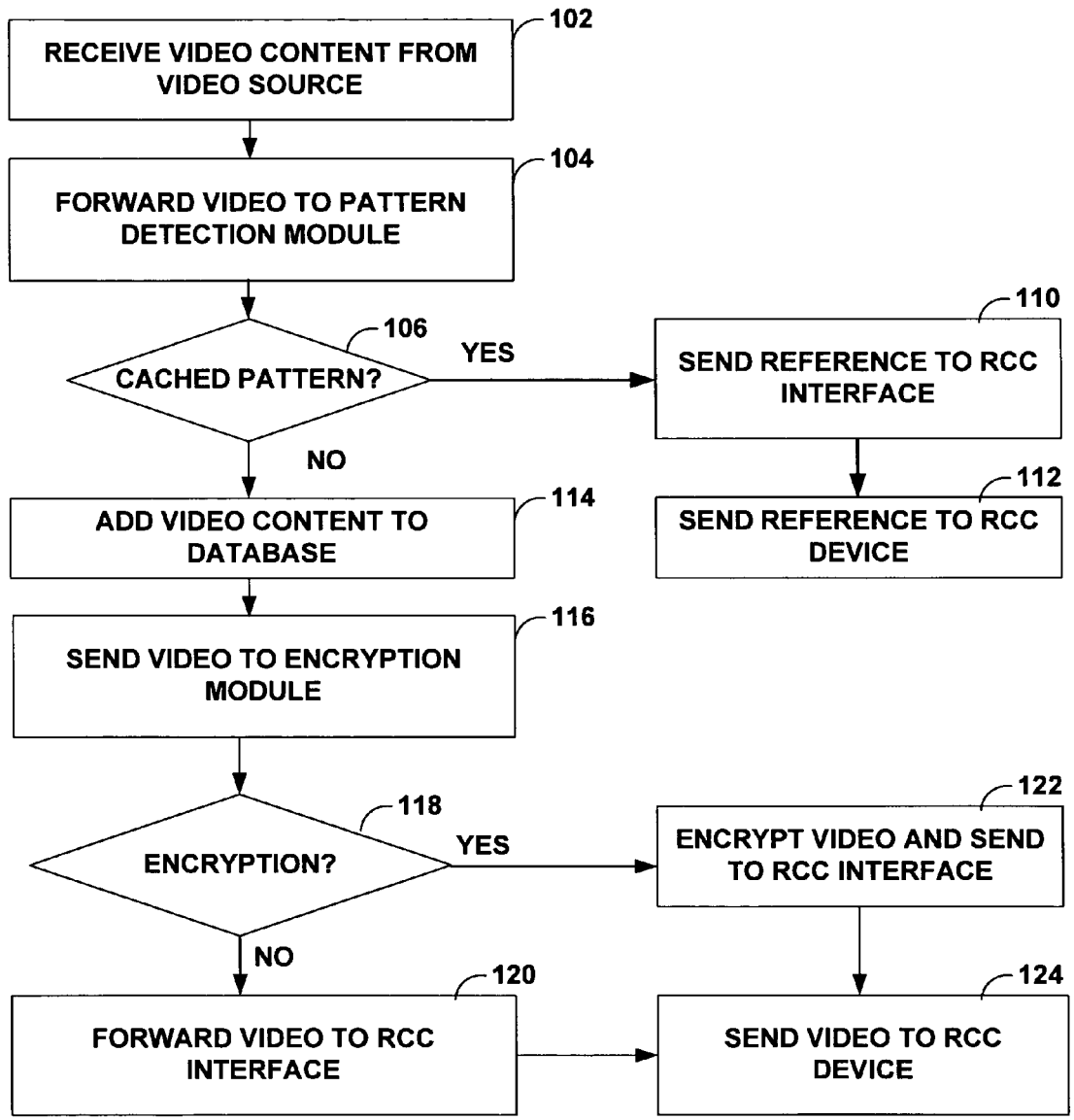
FIG. 5 is a flow chart illustrating an example operation of an RCD device.

FIG. 5 is a flowchart illustrating an example operation of an RCD device. The operation is described herein with reference to RCD 50 from FIG. 3. Initially, video source interface 52 within RCD device 6 receives a video stream from video server 4 for a subscriber device (102). While receiving the video stream, video source interface 52 forwards the received video stream to pattern detection module 54 (104). Pattern detection module 54 determines if an RCC device in the subscriber network of the subscriber device has cached a video pattern in the video stream (106). In some embodiments, pattern detection module 54 accesses the cache of the RCC device in the subscriber network of the requesting subscriber device to determine if the RCC device has cached the video pattern.

If pattern detection module 54 determines that the RCC device has cached the video pattern in the video stream (yes branch of 106), then pattern detection module 54 sends a video pattern identifier associated with the video pattern to RCC interface 60 in place of the video pattern (110). RCC interface 60 receives the video pattern identifier and forwards a communication that includes the video pattern identifier to RCC device 70 (112). If the RCC device has not cached the video pattern (no branch of 106), pattern detection module 54 may assign a video pattern identifier to the video pattern. After assigning the video pattern identifier to the video pattern, pattern detection module 54 may add the video pattern or a pattern indicative of the video pattern, the video pattern identifier, and a reference to the RCC device to pattern database 56 (114). Pattern detection module 54 may then forward the video stream to encryption module 58 (116).

Encryption module 58 reads the conditional access status received from RCC interface 60 to determine whether RCC device 70 requires RCD device 6 to encrypt the video stream (118). If RCC device 70 requires RCD device 6 to encrypt the video stream (yes branch of 118), encryption module 58 encrypts the video stream and sends the encrypted video stream to RCC interface 60 (122). Next, RCC interface 60 sends the encrypted video stream to RCC device 70 (124). If RCC device 70 does not require RCD device 6 to encrypt the video pattern (no branch of 118), encryption module 58 forwards the unencrypted video pattern to RCC interface 60 (120). After receiving the unencrypted video pattern, RCC interface 60 forwards the unencrypted video pattern along with the associated video pattern identifier to RCC device 70 (124).

Figure 6A:
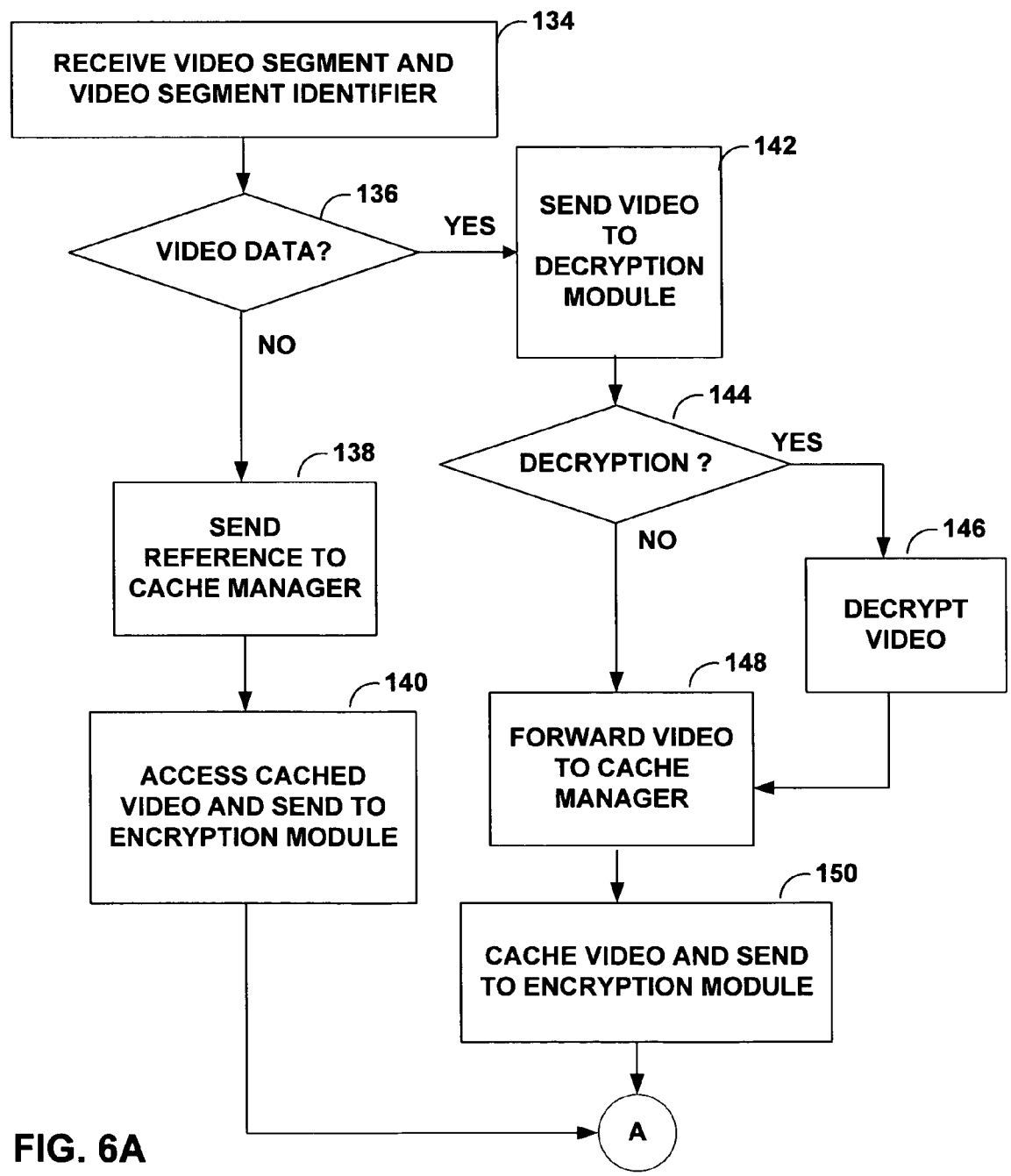
FIGS. 6A and 6B are flow charts illustrating an example operation of an RCC device.
Figure 6B:
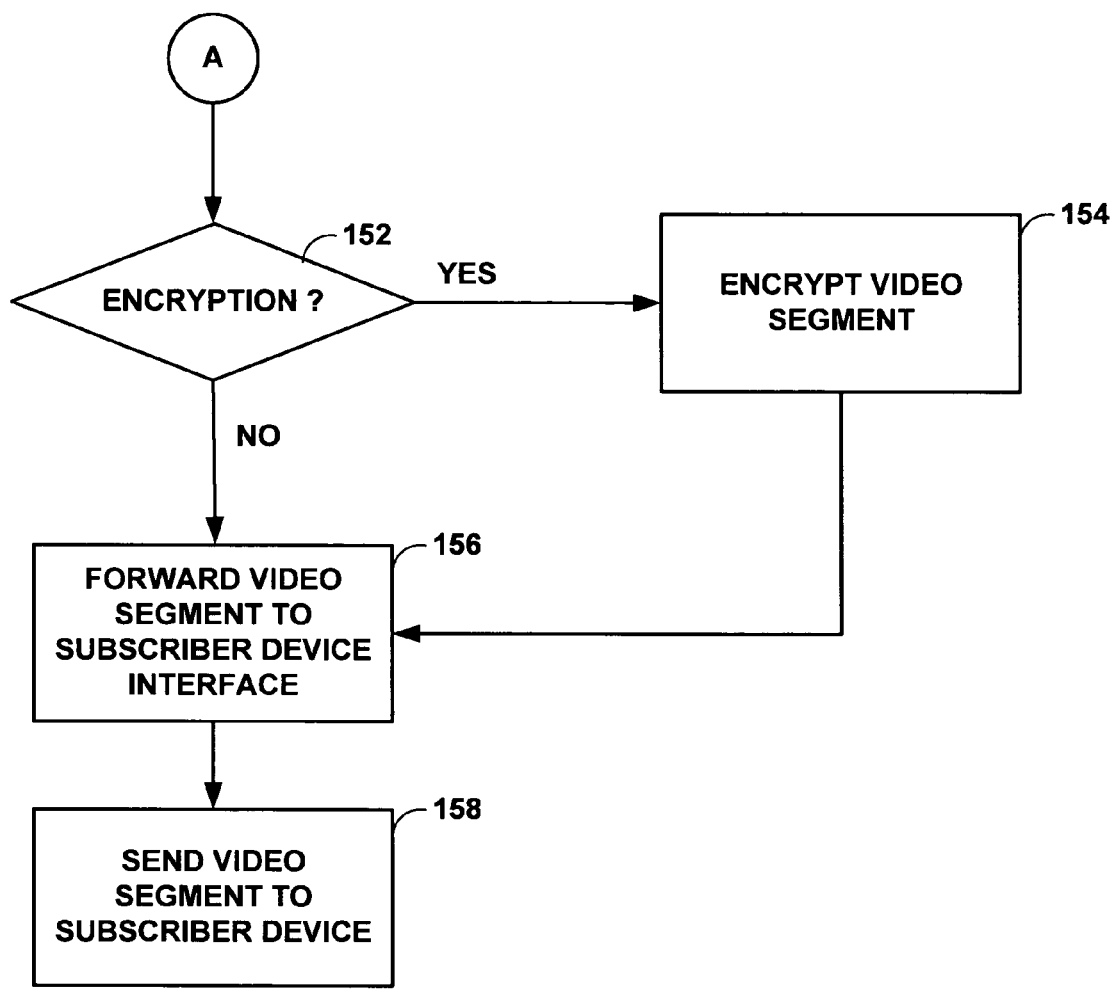

FIGS. 6A and 6B are flowcharts illustrating an example operation of an RCC device. The operation is described herein in reference to RCC device 70 from FIG. 3. Initially RCD interface 72 receives a intermittent video stream and video pattern identifiers (134). If RCD interface 72 receives a video pattern identifier associated with a cached video pattern (no branch of 136), RCD interface 72 forwards the video pattern identifier to cache manager 76 (138). Cache manager 76 accesses video pattern cache 78 in order to obtain the cached video pattern associated with the video pattern identifier. Cache manager 76 then forwards the retrieved video pattern to encryption module 80 as a video stream (140).

If RCD interface 72 receives a video stream (yes branch of 136), RCD interface 72 forwards the video stream to decryption module 74 (142). Upon receiving the video stream, the decryption module determines whether RCD device 6 encrypted the video pattern (144). If RCD device 6 encrypted the video stream (yes branch of 144), decryption module 74 may decrypt the video stream (146). After decrypting the video stream, decryption module 74 forwards the video stream to cache manager 76 (148). On the other hand, if RCD device 6 did not encrypt the video stream, decryption module 74 forwards the video stream to cache manager 76 (148). If the command information from RCD device 6 has instructed RCC device 70 to cache a video pattern in the video stream, cache manager 76 caches the video pattern in video pattern cache 78 along with a video pattern identifier assigned to the video pattern. Cache manager 76 then forwards the video stream to encryption module 80 (150).

After encryption module 80 receives the video stream, encryption module 80 determines whether to encrypt the video stream by reading the conditional access status of the subscriber device (152). If encryption module 80 determines it should encrypt the video stream (yes branch of 152), then encryption module 80 encrypts the video stream (154) and forwards the video stream to subscriber device interface 82 (156). If encryption module 80 determines that it should not encrypt the video stream (no branch of 152), then encryption module 80 forwards the unencrypted video stream to subscriber device interface 82 (156). In turn, subscriber device interface 82 sends the video stream to the requesting subscriber device (158).

Figure 7:
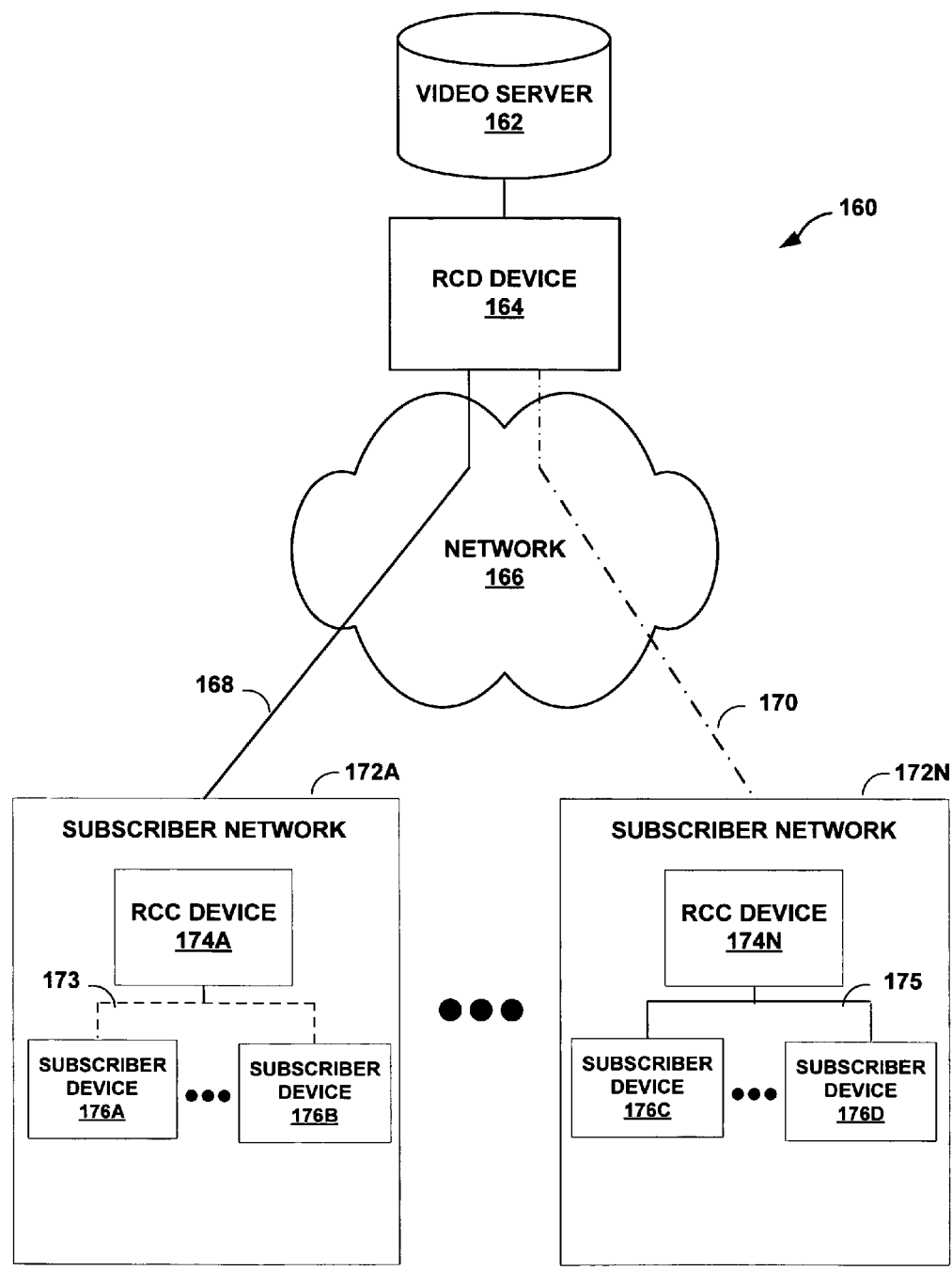
FIG. 7 is a block diagram illustrating two exemplary conditional access schemes implemented within a video delivery system.

FIG. 7 is a block diagram illustrating two exemplary conditional access schemes implemented within a video delivery system 160. Video delivery system 160 may operate substantially similar to video delivery system 2 from FIG. 1. In the example embodiment, video delivery system 160 includes a video server 162 connected directly or through a network to a RCD device 164. Although not shown in FIG. 7, video delivery system 160 may contain a plurality of RCD devices.

Furthermore, the functionality of RCD device 164 may be incorporated into video server 162.

Video server 162 and RCD device 164 communicate with numerous remotely located subscriber networks 172A-172N ("subscriber networks 172") via network 166. Network 166 may comprise any private or public network, such as the Internet. Network 166 represents any computer network and may have a variety of networked resources capable of data communication. For example, network 166 may include routers, hubs, gateways, switches or other components.

Subscriber networks 172 contain repeated content cache (RCC) devices 174A-174N ("RCC devices 174"), respectively, for communicating with RCD device 164 via network 166. Furthermore, each of RCC devices 174 connects directly or through a network to multiple subscriber devices. For purposes of illustration, FIG. 7 depicts RCC device 174A connected to subscriber devices 176A and 176B and depicts RCC device 174N connected to subscriber devices 176C and 176D. Subscriber devices 176A-176D ("subscriber device 176") may comprise set-top boxes, digital video recorders, desktop computers, laptops, workstations, PDAs, wireless devices, network-ready appliances, file servers, print servers or other devices. In other embodiments, each of RCC devices 174 may be connected to any number of subscriber devices 176.

In one conditional access example, RCD device 164 sends an unencrypted video stream 168 across network 166 to RCC device 174A. Upon receipt of unencrypted video stream 168, RCC device 174A encrypts the video stream and forwards the encrypted video stream 173 to subscriber device 176A. Subscriber device 176A then decrypts the video stream prior to viewing.

In another conditional access example, RCD device 164 extracts a few blocks of video data from a video stream and encrypts just these blocks prior to sending video stream, over network 166 to RCC device 174N. The encrypted blocks of video data may comprise just a few hundred bytes of a video stream. RCD device 164 sends the remaining portions of the video stream and/or video pattern identifiers as described above. Upon receipt of the partially encrypted video stream, RCC device 174N decrypts the encrypted blocks and sends the unencrypted video stream to subscriber device 176C. Additionally, as was illustrated in FIG. 1, a video delivery system may be configured to operate without a conditional access scheme. Thus, any RCD device may communicate with numerous RCC devices in multiple subscriber networks via a variety of conditional access schemes or in the absence of any conditional access schemes.

Various embodiments of the invention have been described. These and other embodiments are within the scope of the following claims.

The invention claimed is:

1. A method comprising:
   receiving, with a first intermediate device, a video stream output by the source device for a plurality of destination devices, wherein the first intermediate device is positioned between the source device and a second intermediate device, and wherein the second intermediate device is positioned between the first intermediate device and the plurality of destination devices;
   forwarding, with the first intermediate device, the video stream received from the source device to the second intermediate device;
   sending, with the first intermediate device, a first communication to the second intermediate device directing the second intermediate device to cache a video pattern of the video stream;
   after sending the first communication directing the second intermediate device to cache the video pattern, comparing, with the first intermediate device, received video patterns of the video stream with previously received video patterns to detect repeated video patterns from the source device;
   upon detecting one of the repeated video patterns in the video stream with the first intermediate device, sending a second communication from the first intermediate device to the second intermediate device directing the second intermediate device to output the detected video pattern; and
   maintaining, with the first intermediate device, a directory that includes the second intermediate device and the video pattern cached in the second intermediate device.

2. The method of claim 1, wherein comparing the received video patterns with previously received video patterns comprises accessing the directory to determine if the video patterns received from the video source have previously been sent to the second intermediate device.

3. The method of claim 1, further comprising encrypting the video stream received from the source device.

4. The method of claim 1, wherein forwarding the video stream comprises compressing the video pattern via a lossless compression algorithm for transmission to the first intermediate device.

5. The method of claim 1, wherein forwarding the video stream comprises compressing the video pattern via a lossy compression algorithm for transmission from the source device to the first intermediate device.

6. The method of claim 1, wherein sending the second communication comprises sending a cache location of the cached video pattern to the second intermediate device, wherein the cache location specifies a location within a cache maintained by the second intermediate device.

7. The method of claim 1, wherein sending the second communication comprises sending a video pattern identifier associated with the cached video pattern.

8. The method of claim 1,
   wherein the second intermediate device comprise one of a plurality of intermediate devices positioned between the first intermediate device and the plurality of destination devices; and
   wherein maintaining the directory comprises maintaining a directory that includes an entry that describes a relationship between the plurality of intermediate devices and video patterns cached by each of the plurality of intermediate devices.

9. The method of claim 1, wherein the directory comprises a video pattern database.

10. The method of claim 1,
    wherein the first intermediate device comprises a repeated content detection (RCD) device, and
    wherein the second intermediate device comprises a repeated content cache (RCC) device.

11. A method comprising:
    receiving a video stream from a source device via a first intermediate device, wherein the video stream is received by a second intermediate device positioned between the first intermediate device and a destination device;
    caching, within the second intermediate device, a video pattern in the video stream based upon a first communication received from the first intermediate device; and
    delivering, with the second intermediate device, a full video stream from the second intermediate device to the destination device by splicing together the cached video pattern with video patterns received from the source device based upon a second communication received from the first intermediate device, wherein the second communication directs the second intermediate device to output the cached video pattern, and wherein the second intermediate device performs the splicing of the cached video patterns and the received video patterns to deliver the full video stream to the destination device.

12. The method of claim 11, further comprising receiving with the second intermediate device a cache location of the cached video pattern from the first intermediate device.

13. The method of claim 11, further comprising receiving a video pattern identifier associated with the cached video pattern.

14. The method of claim 11, further comprising encrypting the cached video pattern.

15. The method of claim 11, further comprising decrypting the video pattern.

16. The method of claim 11, wherein sending the cached video pattern:
   accessing a video pattern cache in which the cached video pattern is stored; and
   retrieving the cached video pattern based on the second communication.

17. The method of claim 16, wherein the second communication includes one of a cache location of the cached portion of the video stream or a video pattern identifier assigned to the cached video pattern.

18. The method of claim 11,
   wherein the first intermediate device comprises a repeated content detection (RCD) device, and
   wherein the second intermediate device comprises a repeated content cache (RCC) device.

19. A system comprising:
   a video source device;
   a first intermediate device that receives a video stream output from the video source device;
   a second intermediate device,
   wherein the first intermediate device is positioned between the video source device and the second intermediate device,
   wherein the first intermediate device forwards the video stream received from the video source device to the second intermediate device, sends a first communication to the second intermediate device directing the second intermediate device to cache a pattern of the video stream, after sending the first communication directing the second intermediate device to cache the video pattern, compares received video patterns of the video stream with previously received video patterns to detect a repeated video pattern form the video source device, upon detecting the repeated video pattern in the video stream, sends a second communication to the second intermediate device directing the second intermediate device to retrieve and output the detected video pattern and maintains a directory that includes the second intermediate device and the video pattern cached in the second intermediate device, and
   wherein the second intermediate device caches the pattern in response to the first communication and outputs the detected video pattern in response to the second communication; and
   a plurality of destination devices that receive the detected pattern of the video stream from the second intermediate device, wherein the second intermediate device is positioned between the first intermediate device and the plurality of destination devices.

20. An intermediate network device positioned between a source device and downstream intermediate network device, the intermediate network device comprising:
   an intermediate device interface that forwards a video stream received from the source device to the downstream intermediate network device, forwards the video stream received from the source device to the downstream intermediate network device, and sends a first communication to the downstream intermediate device directing the downstream intermediate network device to cache a video pattern of the video stream,
   wherein the intermediate device interface, after sending the first communication directing the downstream intermediate network device to cache the video pattern, further compares received video patterns of the video stream with video patterns previously received from the source device to detect repeated video patterns, and
   wherein, upon detecting one of the repeated video patterns in the video stream, the intermediate device interface sends a second communication to the downstream intermediate network device directing the downstream intermediate network device to output the detected video pattern of the video stream; and
   a video pattern database that maintains a directory including the downstream intermediate network device and the cached video pattern of the video stream cached in the downstream intermediate network device, wherein the downstream intermediate network device is positioned between the intermediate network device and at least one destination device.

21. The device of claim 20, further comprising a video source interface that receives the video stream from the source device.

22. The device of claim 20, further comprising a pattern detection module that detects repeated video patterns received from the source device.

23. The device of claim 22, wherein the pattern detection module detects repeated video patterns of video content at bit-level granularity.

24. The device of claim 22, wherein the pattern detection module detects repeated video patterns of video content at blocks of pixels granularity.

25. The device of claim 22, wherein the pattern detection module detects near-repeated video patterns of video data at blocks of pixels granularity.

26. The device of claim 20, further comprising an encryption module that encrypts the video stream received from the source device prior to forwarding the video stream to the downstream intermediate device.

27. The device of claim 20, wherein the second communication comprises one of a cache location of the cached portion of the video stream or a reference associated with the cached portion of the video stream.

28. The device of claim 20,
   wherein the intermediate device comprises a repeated content detection (RCD) device, and
   wherein the downstream intermediate device comprises a repeated content cache (RCC) device.

29. The device of claim 20, wherein the source device comprises a video server.

30. An intermediate network device comprising:
   an intermediate device interface that receives a video stream from a source device via an upstream intermediate network device positioned between the intermediate device and the source device, wherein the intermediate device interface further receives a first communication from the upstream intermediate network device directing the intermediate network device to cache a video pattern of the video stream;

a cache manager that caches the video pattern of video stream based upon the first communication received from the upstream intermediate device, wherein, after receiving the first communication directing the intermediate device to cache the video pattern, the intermediate device interface receives a second communication from the upstream intermediate device indicating that the upstream intermediate device detected a repeated video pattern based on a comparison of received video patterns of the video stream and previously received video patterns, wherein the second communication directs the intermediate device to output the detected video pattern; and a subscriber device interface that delivers a full video stream to a destination device by splicing together the detected video pattern with video patterns received from the source device based upon the second communication received from the upstream intermediate device.

31. The device of claim 30, further comprising an encryption module that encrypts the cached video pattern prior to sending the cached portion of the video stream to the destination device.

32. The device of claim 30, further comprising a decryption module that decrypts the video stream received from the source device via the upstream intermediate device.

33. The device of claim 30, wherein the cache manager accesses a video pattern cache in which the cached video pattern is stored and retrieves the cached video pattern based on the second communication.

34. The device of claim 30, wherein the second communication comprises one of a cache location of the cached portion of the video stream or a video pattern identifier associated with the cached portion of the video stream.

35. The device of claim 30,
wherein the intermediate device comprises a repeated content cache (RCC) device, and
wherein the upstream intermediate device comprises a repeated content detection (RCD) device.

36. The device of claim 30, wherein the source device comprises a video server.

37. The method of claim 1,
wherein the video pattern of the video stream cached by the second intermediate device comprises only a portion of a video program.

38. The method of claim 37, further comprising inserting, with the second intermediate device, advertising into the video program between video patterns of the video stream.

39. The method of claim 1,
wherein the video pattern cached by the second intermediate device comprises only one of a plurality of video patterns that constitute the full video stream received from the source device, and
wherein the plurality of video patterns form a video program that the source device provides as the full video stream.

\* \* \* \* \*

UNITED STATES PATENT AND TRADEMARK OFFICE
CERTIFICATE OF CORRECTION

| | | |
|---|---|---|
| PATENT NO. | : 7,770,198 B1 | Page 1 of 1 |
| APPLICATION NO. | : 11/303744 | |
| DATED | : August 3, 2010 | |
| INVENTOR(S) | : Spencer Greene | |

It is certified that error appears in the above-identified patent and that said Letters Patent is hereby corrected as shown below:

In the Claims

Column 10, line 40 (Claim 8), "intermediate device comprise one" should read -- intermediate device comprises one --

Column 11, line 51 (Claim 19), "repeated video pattern form the" should read -- repeated video pattern from the --

Signed and Sealed this
Ninth Day of September, 2014

Michelle K. Lee
*Deputy Director of the United States Patent and Trademark Office*